(12) United States Patent
Feshali et al.

(10) Patent No.: US 11,803,013 B2
(45) Date of Patent: Oct. 31, 2023

(54) SEAMLESS STITCHING FOR MULTI-RETICLE FABRICATION OF INTEGRATED PHOTONICS OPTICAL COMPONENTS

(71) Applicant: Anello Photonics, Inc., Santa Clara, CA (US)

(72) Inventors: Avi Feshali, Los Angeles, CA (US); Warren Bruce Jin, Goleta, CA (US); Mario Paniccia, Santa Clara, CA (US)

(73) Assignee: Anello Photonics, Inc., Santa Clara, CA (US)

( * ) Notice: Subject to any disclaimer, the term of this patent is extended or adjusted under 35 U.S.C. 154(b) by 0 days.

(21) Appl. No.: 17/710,847

(22) Filed: Mar. 31, 2022

(65) Prior Publication Data
US 2022/0317373 A1    Oct. 6, 2022

Related U.S. Application Data

(60) Provisional application No. 63/170,421, filed on Apr. 2, 2021.

(51) Int. Cl.
*G02B 6/13*        (2006.01)
*G01C 19/64*    (2006.01)
*G02B 6/12*        (2006.01)

(52) U.S. Cl.
CPC ............. *G02B 6/13* (2013.01); *G01C 19/64* (2013.01); *G02B 6/12004* (2013.01)

(58) Field of Classification Search
CPC .... G02B 6/13; G02B 6/12004; G02B 6/3596; G02B 6/12007; G02B 6/3546; G02B 2006/12145; G02B 6/356; G02B 6/3508; G02B 6/3502; G02B 6/3584; G02B 6/122; G02B 6/1228; G02B 6/125; G02B 6/3556; G02B 2006/12147; G01C 19/64; G02F 1/295
See application file for complete search history.

(56) References Cited

U.S. PATENT DOCUMENTS

| | | | |
|---|---|---|---|
| 5,298,761 A | 3/1994 | Aoki et al. | |
| 5,631,120 A * | 5/1997 | Swirbel | G03F 7/168 430/394 |
| 6,333,138 B1 | 12/2001 | Higashikawa et al. | |
| 6,363,183 B1 * | 3/2002 | Koh | G02B 6/3584 385/16 |

(Continued)

OTHER PUBLICATIONS

Warren Jin et al., "Seamless multi-reticle photonics", Optics Letters, 2984 vol. 46, No. 12, revised May 21, 2021; accepted May 26, 2021; posted May 26, 2021 (Doc. ID 427289); published Jun. 15, 2021, 4 pages.

(Continued)

*Primary Examiner* — Mohamed K Amara
(74) *Attorney, Agent, or Firm* — Lowenstein Sandler LLP; Madhumita Datta

(57) ABSTRACT

Aspects of the present disclosure are directed to fabrication of large-footprint chips having integrated photonic components comprising low-loss optical waveguides. The large footprint chips require the use of multiple reticles during fabrication. Stitching adjacent reticle fields seamlessly is accomplished by overlaying into adjacent reticle fields, tapering waveguide ends, and using strategically placed alignment marks in the die.

18 Claims, 5 Drawing Sheets

(56) References Cited

U.S. PATENT DOCUMENTS

| | | | |
|---|---|---|---|
| 6,517,997 B1* | 2/2003 | Roberts | G02B 6/13 |
| | | | 430/394 |
| 7,282,311 B2* | 10/2007 | Little | G02B 6/12007 |
| | | | 430/311 |
| 7,310,459 B1 | 12/2007 | Rahman | |
| 9,036,968 B2* | 5/2015 | Gubenko | G02B 6/1228 |
| | | | 385/43 |
| 9,948,402 B2 | 4/2018 | De Dobbelaere et al. | |
| 10,332,553 B1* | 6/2019 | Staffaroni | G11B 5/6082 |
| 10,731,988 B1 | 8/2020 | Paniccia et al. | |
| 10,852,492 B1* | 12/2020 | Vermeulen | G02B 6/423 |
| 10,969,548 B2 | 4/2021 | Paniccia et al. | |
| 10,989,873 B1* | 4/2021 | Jacob | G02B 6/12002 |
| 11,016,253 B1* | 5/2021 | Puckett | G02B 6/12002 |
| 11,371,843 B2* | 6/2022 | Feshali | G02B 6/125 |
| 2003/0039928 A1* | 2/2003 | Bollinger | G03F 1/44 |
| | | | 430/311 |
| 2006/0002676 A1 | 1/2006 | Balch et al. | |
| 2006/0040190 A1* | 2/2006 | Little | G03F 7/70475 |
| | | | 430/311 |
| 2007/0297715 A1* | 12/2007 | Little | G02B 6/13 |
| | | | 385/14 |
| 2010/0209061 A1* | 8/2010 | Sumetsky | G02B 6/2861 |
| | | | 264/1.28 |
| 2011/0129231 A1* | 6/2011 | Fiorentino | G02B 6/4204 |
| | | | 398/141 |
| 2014/0192394 A1 | 7/2014 | Sun et al. | |
| 2016/0197111 A1* | 7/2016 | Coolbaugh | H01L 21/02381 |
| | | | 438/69 |
| 2016/0359568 A1* | 12/2016 | De Dobbelaere | G02B 6/4279 |
| 2017/0047312 A1* | 2/2017 | Budd | H01L 23/585 |
| 2019/0066722 A1* | 2/2019 | Maletzky | G11B 5/3133 |
| 2019/0253775 A1* | 8/2019 | Seok | H04J 14/02 |
| 2020/0057197 A1* | 2/2020 | Chong | G02B 6/122 |
| 2020/0194168 A1* | 6/2020 | Zou | H04L 21/02 |
| 2020/0284978 A1* | 9/2020 | Kharas | G02B 6/136 |
| 2020/0313397 A1* | 10/2020 | Jung | H01S 5/3406 |
| 2020/0348587 A1* | 11/2020 | Mekking | H01L 21/0274 |
| 2021/0018679 A1* | 1/2021 | Manier | G02B 6/4224 |
| 2021/0126429 A1* | 4/2021 | Venkatesan | H01S 5/02326 |
| 2021/0191046 A1* | 6/2021 | Seok | G02B 6/29344 |
| 2022/0317381 A1* | 10/2022 | Seok | G02B 6/3508 |

OTHER PUBLICATIONS

PCT International Search Report and Written Opinion for International Application No. PCTUS2022023114 dated Aug. 9, 2022, 11 pages.

* cited by examiner

SEAMLESS STITCHING FOR MULTI-RETICLE FABRICATION OF INTEGRATED PHOTONICS OPTICAL COMPONENTS

RELATED APPLICATIONS

This application is related to and claims the benefit of U.S. Provisional Patent Application No. 63/170,421, filed Apr. 2, 2021, titled "Seamless Stitching For Multi-Reticle Fabrication Of Integrated Photonics Optical Components," the entirety of which is incorporated herein by reference.

TECHNICAL FIELD

The present disclosure relates to various structures and fabrication methods for large footprint integrated photonics-based optical components having low loss waveguides.

BACKGROUND

Various integrated photonics components are used for a variety of applications including, but are not limited to, military, aircraft navigation, robotics, autonomous vehicles, virtual reality (VR), augmented reality (AR), gaming etc. For example, head-mounted or helmet-mounted displays (HMD) or displays mounted on other body parts or wearable items can use integrated photonics components. Near Eye Display (NED) is a type of HMD that can be used for gaming, commercial or military (e.g. military pilot helmet) applications. Examples of integrated photonics components include optical gyroscopes, optical delay lines, optical phase arrays etc. For example, Artificial Intelligence (AI)/Machine Learning (ML) processing chips may have arrays of "n×n" optical switches and cross bars. Quantum computing processing chips can also have these optical components. Another example is LIDAR chips in autonomous terrestrial, marine or aerial vehicles.

Photonics optical gyroscopes (also referred to in short as "gyros") are one use case of integrated photonic components. Gyroscopes sense angular rotation. Gyroscopes can be mechanical or optical, and can vary in precision, performance, cost and size. Since optical gyroscopes do not have any moving parts, they have advantages over mechanical gyroscopes as they can withstand effects of shock, vibration and temperature variation better than the mechanical gyroscopes with moving parts. The most common optical gyroscope is the fiber optical gyroscope (FOG) that operates based on interferometric measurements of optical phase shift due to the Sagnac effect (a phenomenon encountered in interferometry that is elicited by rotation). Construction of a FOG typically involves a coil comprising several turns of polarization-maintaining (PM) fiber. Laser light is launched into both ends of the PM fiber coil so that two optical beams travel in opposite directions. If the fiber coil is moving, the optical beams traveling in opposite directions experience different optical path lengths with respect to each other. By setting up an interferometric system, one can measure the small path length difference that is proportional to the area of the loop enclosed by the turns of the fiber coil and the angular velocity of the rotating fiber coil. This path length difference is expressed as a phase difference (referred to as "phase signal") between two counter-rotating beams.

Phase signal of an optical gyro is proportional to the Sagnac effect times the angular rotation velocity, as shown in the following equation:

$$\Delta\phi = (8\pi NA/\lambda c)\Omega$$

where, N=number of turns in the gyro,
A=area enclosed
$\Omega$=angular rotation velocity
$\Delta\phi$=optical phase difference signal
$\lambda$=wavelength of light
c=speed of light Fiber-based gyroscopes can provide very high precision, but at the same time, they are of larger footprint, are very expensive, and are hard to assemble due to the devices being built based on discrete optical components that need to be aligned precisely. Often, manual alignment is involved, which is hard to scale up for volume production.

Present inventors propose replacing fibers with waveguide based integrated photonics components for cost-effective easy integration on a semiconductor platform which is much more promising for volume production of gyroscopes. Additionally, present inventors propose other optical components for custom processing chips for the various personal, commercial or military applications mentioned above.

This application describes various structures including integrated photonics waveguides fabricated on a silicon platform, as elaborated below. The waveguide-based structures disclosed here can have large footprint that needs to be fabricated using multiple reticles. Therefore, seamless stitching between multiple areas within a die exposed using different reticles becomes imperative.

SUMMARY

Present inventors propose using waveguide based integrated photonics components for cost-effective easy integration on a semiconductor platform which is much more promising for volume production of photonics components. This application describes various structures and processes for fabricating optical waveguides. The waveguide constitutes a waveguide core surrounded by corresponding claddings.

Photonics based optical components may include optical gyroscopes (also referred to as "gyros"), though other types of optical components are also within the scope of this disclosure. As an illustrative example, integrated photonics based optical gyroscopes have reduced size, weight, power and cost, but in addition can be mass produced in high volume, are immune to vibration and have the potential to offer performances equivalent to traditional fiber optic gyroscopes (FOGs).

One key element of this integrated photonic solution is to produce very low loss waveguides that can be manufactured using wafer scale processes. The technology platform used for this integrated photonics based optical gyros is based on silicon nitride (Si3N4)—sometimes also referred to as SiN for simplicity.

Disclosed herein are configurations and methods to produce very low loss waveguides that can be used on a silicon photonics platform, though compound semiconductor (III-V semiconductor) based integrated photonics optical gyroscopes are also within the scope of this disclosure. Furthermore, some embodiments of the integrated photonics optical gyroscopes may have a combination of silicon photonics and III-V semiconductor based photonics components.

Specifically, this disclosure describes a method for fabricating integrated photonics-based optical components on a large-footprint (i.e. a footprint large enough that cannot be accommodated in a single reticle field) die using a plurality of reticles. The method comprises: using a first reticle to fabricate a first portion of the die containing a first portion of an optical waveguide that constitutes an integrated photonics-based optical component; using a second reticle to fabricate a second portion of the die containing a second portion of the optical waveguide that constitutes the integrated photonics-based optical component; and, stitching respective fields of the first reticle and the second reticle in a way such that the first portion of the waveguide and the second portion of the optical waveguide are aligned on the same plane to create a seamless interface for a guided optical beam that propagates along the optical waveguide, wherein the respective fields of the first reticle and the second reticle are adjacent to each other.

The disclosure further teaches, including a first portion of an alignment mark in the first reticle; including a second portion of the alignment mark in the second reticle; and, using an alignment between the first portion of the alignment mark and the second portion of the alignment mark as an indicator of a degree of alignment between the first portion of the optical waveguide and the second portion of the optical waveguide when the respective fields of the first reticle and the second reticle are stitched with each other.

The first portion of the alignment mark and the second portion of the alignment mark may together constitute a Vernier caliper. The Vernier caliper indicates the degree of alignment along a direction on the plane that is perpendicular to a direction of propagation of the guided optical beam.

In another aspect, at least one of the reticles may have a tapered structure that extends from the field of one reticle to the field of the other reticle. The tapered structure is at an end of the portion of the optical waveguide within a field of a reticle. Relevant dimensions of the tapered structure, such as a taper angle and a taper length, are designed based on a mode of the guided optical beam. The tapered structure creates an overlay region that facilitates in creating the seamless interface for the guided optical beam during stitching of the respective reticle fields of the first reticle and the second reticle by minimizing optical loss due to possible misalignment along a direction perpendicular to the direction of propagation of the guided optical beam.

In an aspect of the disclosure, the die is fabricated using the following process: coating an entire wafer containing the die with photoresist; using the first reticle to fabricate the first portion of the die, wherein the first reticle has an overlay region that extends into an adjacent field of a second reticle; aligning an exposure tool with the first reticle; exposing the field of the first reticle; using the second reticle to fabricate the second portion of the die wherein the second reticle has another overlay region that extends into an adjacent field of the first reticle; aligning the exposure tool to fabricate the second portion of the die; performing post-exposure bake, such that the overlay regions are exposed twice; and developing the photoresist to create underlying integrated photonics-based optical components of the die.

The integrated photonics-based optical component may be a rotation sensing element of an optical gyroscope. In one embodiment, the rotation sensing element is a waveguide coil with multiple turns. In another embodiment, the rotation sensing element is a waveguide loop with a single turn comprising a microresonator ring.

In other embodiments, the integrated photonics-based optical component may comprise an optical delay line, an optical phase array, an n×m optical switch, a cross bar switch, or other waveguide-based elements.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to configurations of compact ultra-low loss integrated photonics-based waveguides with large scale manufacturing in view. These waveguides can be used as optical elements on a planar photonic integrated circuit (PIC). One example of PIC is photonics integrated optical gyroscopes. Other integrated optical elements, such as waveguide-based delay lines, optical phase arrays etc. can also be fabricated using the same fabrication process.

When PIC is used for gyroscopes, the present inventors recognize that with the advent of integrated silicon photonics suitable for wafer scale processing, there is an opportunity to replace FOGs with smaller integrated photonic chip solutions without sacrificing performance. Photonics based optical gyros have reduced size, weight, power and cost, but in addition can be mass produced in high volume, are immune to vibration and have the potential to offer performances equivalent to FOGs. When integrated optical gyroscope is fabricated on a silicon platform, it is abbreviated as SiPhOG® (Silicon Photonics Optical Gyroscope).

One key element of this integrated photonic solution is to produce very low loss waveguide cores. Waveguide cores can be made of silicon nitride ($Si_3N_4$) surrounded by oxide cladding or utilization of fused silica substrate with claddings or another fused silica wafer bonded for cladding. The whole waveguide structure (including core and cladding) is sometimes referred to as SiN waveguide for simplicity. The propagation loss in the SiN waveguides can be well below 0.1 db/meter. This is a vast improvement over the current state-of-the-art SiN process with propagation loss in the range of 0.1 db/centimeter. Note that in alternative embodiments, the waveguide cores may not be SiN, and can be based on other materials, such as optical grade silicon. For example, silicon rib or strip waveguides can also meet the criteria for low-loss waveguides. Waveguide design and choice of material may vary depending on whether single mode or multi-mode optical beam propagation is accommodated within the waveguide structures.

The figures show an optical gyroscope die to illustrate the concept of large footprint dies requiring multiple reticles, but as mentioned in the background section, the concept of multi-reticle fabrication is equally applicable to any large footprint chip having optical components, such as waveguides. For example, quantum computing and AI/ML processing chips are known to have large footprint that goes beyond the size of one reticle. Whenever more than one reticle is used for fabrication, seamless stitching between the multiple reticle fields becomes an essential part of the fabrication process.

Figure 1:
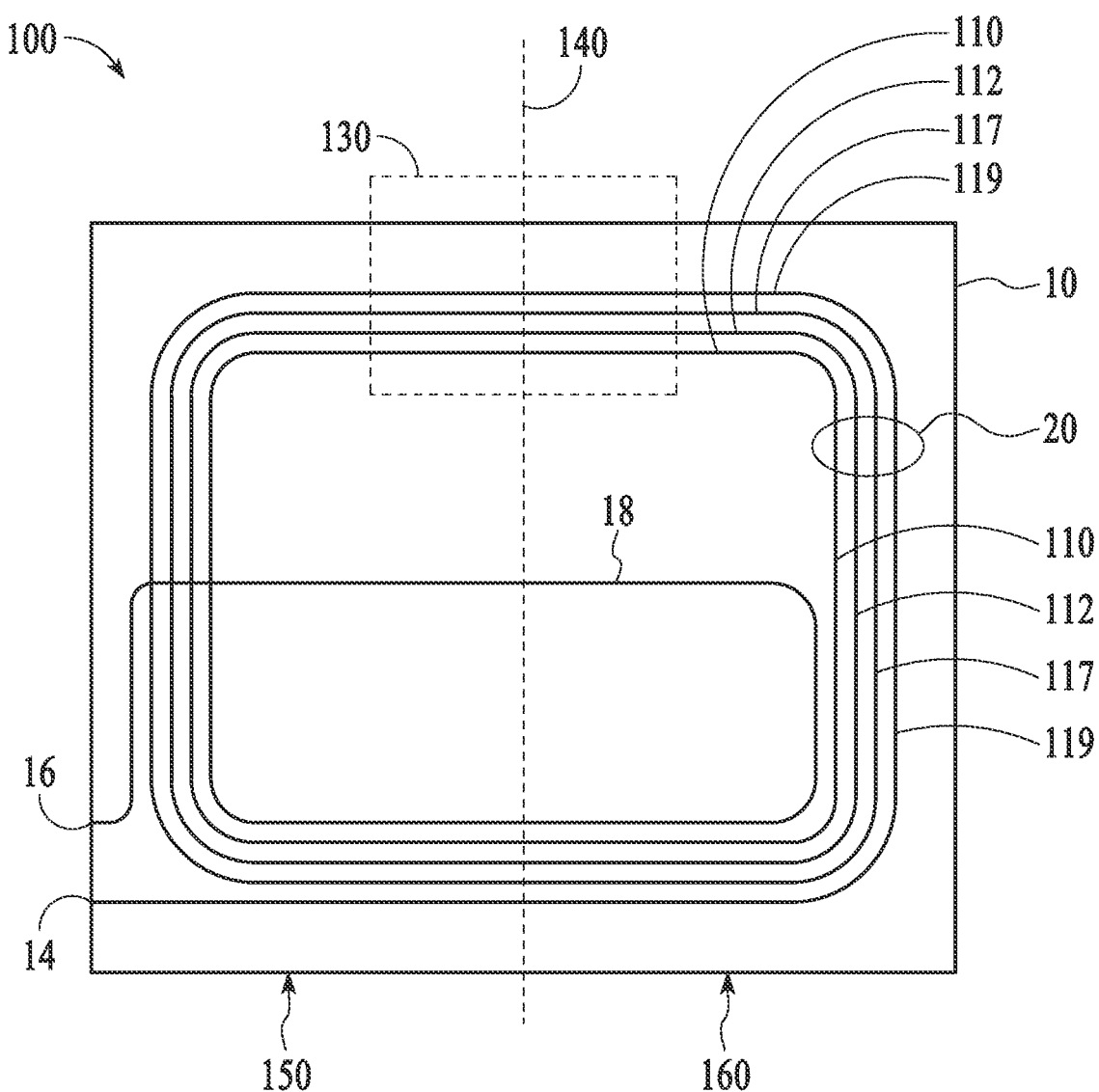
FIG. 1 is a schematic top view of a complete die (multi-reticle fields) for an optical gyroscope coil with multiple turns, according to an embodiment of the present disclosure.

FIG. 1 shows a full die 100 containing the sensing element (such as a waveguide coil 20) of a gyroscope fabricated on the die bounded by the peripheral cut-lines (such as edge 10). Light is launched at a first end 14 of the waveguide coil 20 with several turns. Here only four turns 110, 112, 117 and 119 are shown for clarity, though in a real device, many more turns (for example, several hundreds of turns) can be used, based on the required sensitivity of the gyroscope. After propagating in the waveguide coil, light comes out from a second end 16. Note that since light can be launched from either end 14 or 16, each of the ends can act as an "input" end or an "output end". For simplicity, we refer to first end 14 as "input end" and second end 16 as "output end", and refer to the portion 18 of the waveguide closer to the second end 16 as "output waveguide" 18. In some embodiments, light can be launched at both ends 14 and 16 to obtain phase difference signal from counter-propagating light beams. Waveguide coil design needs to take into account phase interference between counter-propagating beams and/or cross-coupling between adjacent waveguides, such as between 110 and 112, or 112 and 117, or 117 and 119.

One option can be distributing the total length of a waveguide coil with multiple turns (and/or a ring with a single turn) into different vertically separated layers (e.g., two or more layers) that would lead to improved gyro sensitivity without increasing the form factor. Details of a stacked multi-layer gyro configuration are covered in provisional application 62/858,588 filed on Jun. 7, 2019, titled, "Integrated Silicon Photonics Optical Gyroscope on Fused Silica Platform." A follow-up provisional application 62/896,365 filed on Sep. 5, 2019, titled "Single-layer and Multi-layer Structures for Integrated Silicon Photonics Optical Gyroscopes" describes additional embodiments. These two provisional applications were converted into a non-provisional application, which was issued as U.S. Pat. No. 10,969,548. All these applications are incorporated herein by reference. In addition, system-level integration of a silicon photonics based front-end chip and a waveguide chip have been covered in provisional applications 62/872,640 filed Jul. 10, 2019, titled "System Architecture for Silicon Photonics Optical Gyroscopes", and 62/904,443 filed Sep. 23, 2019, titled, "System Architecture for Silicon Photonics Optical Gyroscopes with Mode-Selective Waveguides." These two provisional applications were converted into a non-provisional application, which was issued as U.S. Pat. No. 10,731,988. All these applications are incorporated herein by reference.

However, in the above applications, the need to manufacture a two-layer device arose partly because in a single plane, the adjacent waveguides need to be spaced apart at a pitch that prevents unwanted cross-coupling. Therefore, to keep the footprint of the device more or less same, the total length of the waveguide spiral was distributed between more than one planes. This present disclosure proposes solutions where adjacent waveguides can be packed more tightly in a single plane, i.e. the pitch between adjacent waveguides is reduced in an individual plane. Note that the terms "layer" and "plane" have been used interchangeably. Densely packing waveguides on a single plane may obviate the need to fabricate a multi-layer device altogether, or at least can reduce the number of layers necessary to get a suitable total length of waveguide, as explained below. Note that it may still be necessary to have two layers to avoid waveguide crossing, but one layer may still have the substantial portion of the waveguide coil.

It is known that the sensitivity of an interferometric fiber-optical gyroscope (IFOG) depends on a product of the total length of fiber ('L') and the diameter 'D' of a circular area of the loop enclosed by turns of the fiber coil. This is often referred to as the "L*D product". Note that the enclosed area does not have to be circular, and can be rectangular (as shown in FIG. 1) or any other shape suitable to harness the required performance while utilizing the area on a mask efficiently. So the term "L*D product" is generic to reflect geometry-dependence of gyro sensitivity. The same geometry-dependence analogy applies to a small-footprint SiPhOG®. The size limitation in a fiber-based system is the diameter of the fiber, which is governed by the size of the fiber core and the cladding around it. Similarly, the size limitation in SiPhOG® is determined by the spacing between adjacent cores or the waveguides and the cladding around each core. While L*D product applies to normal fiber gyros, in SiPhOG®, one can directly calculate the sum total of enclosed area for every loop for a multi-turn waveguide coil shown in FIG. 1.

Another factor in planar photonic devices is the limitation of die size that is dictated by the lithography equipment that is used in the fabrication process. For example, in the state-of-the-art process flows, a stepper tool that has a reticle field size of approximately 26 mm×33 mm, which gives a total waveguide length (including all the turns 20 of the waveguide coil) of approximately 20 m when a pitch of 22 um is used to avoid crosstalk. In order to increase the "L.D product", a tighter pitch can be used, which increases the chance of crosstalk. Alternatively, multiple reticle field can be stitched together, which increases manufacturing complexity, especially if stitching introduces waveguide misalignment. For certain applications, such as virtual reality/augmented reality headsets, relatively large footprint of the waveguide coil is needed that necessitates use of multiple reticles to fabricate the structure within a single die. Relatively large footprint dies are also needed for example in AI/ML and quantum computing chips having optical phase arrays. Therefore, stitching of multiple reticle fields cannot be avoided. This application proposes various ways to minimize stitching-induced losses, i.e. making the stitching as seamless as possible.

The complete die 100 in FIG. 1 has a footprint that is larger than what a single reticle can accommodate. Therefore, in this example, two reticles are used to fabricate the entire waveguide coil 20. The area 150 to the left of the demarcation line 140 is fabricated using one reticle, and the area 160 to the right of the demarcation line 140 is fabricated using a second reticle. The bounded area 130 including the demarcation line 140 and the waveguide structures immediately adjacent to the demarcation line 140 are shown in greater detail using an exploded view in FIG. 2.

Figure 2:
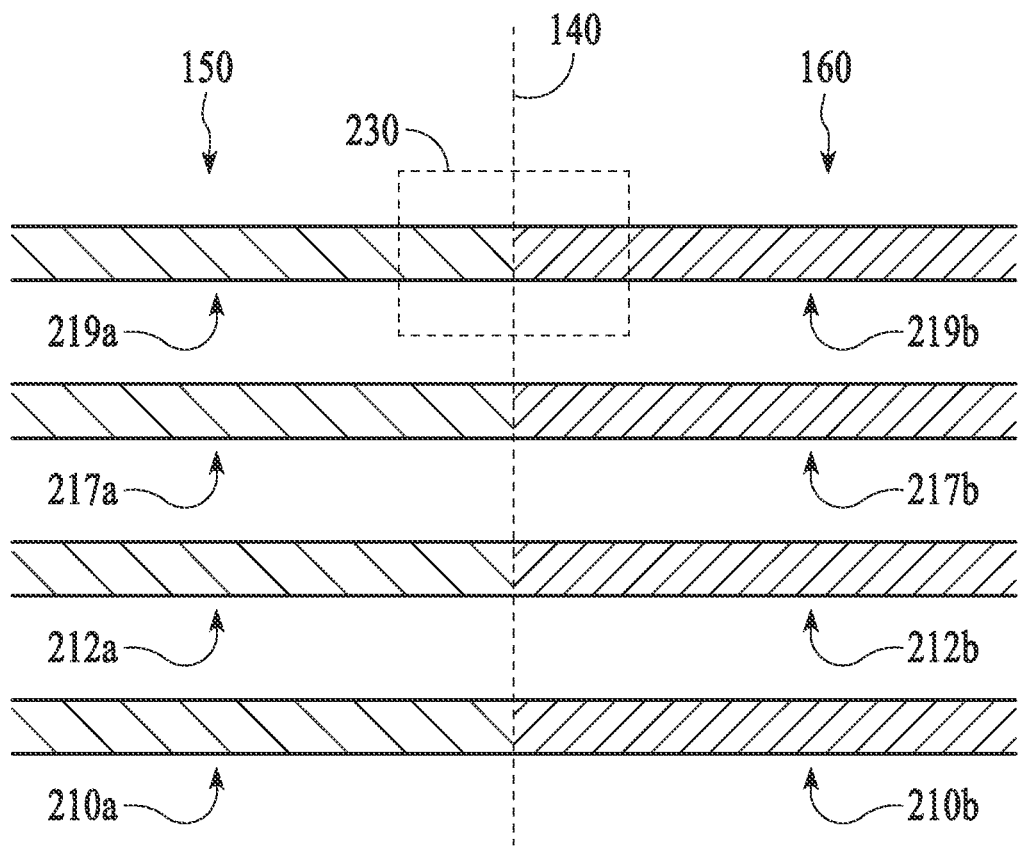
FIG. 2 is an exploded top view of the multiple turns, showing a demarcation line between two reticle fields, according to an embodiment of the present disclosure.

In the exploded view of FIG. 2, portions of the turns 110, 112, 117 and 119 within the bounded area 130 are shown. The left portion of turn 110 is shown as 210a, which is part of one reticle that is used to fabricate the area 150, and the right portion of turn 110 is shown as 210b, which is part of another reticle that is used to fabricate the area 160. That is why the portions are shown with different patterns. Similarly, 212a and 212b are portions of turn 112, 217a and 217b are portions of turn 117, and 219a and 219b are portions of turn 119. In FIG. 2, the ideal situation is depicted where there is no misalignment between the adjacent reticle fields and therefore the stitching error is zero. But in reality, the alignment is not perfect. So FIG. 3 shows how overlay between the two reticle fields and tapering the ends of the waveguides are used to ensure seamless stitching and smooth transition between misaligned photolithographic exposures.

Figure 3:
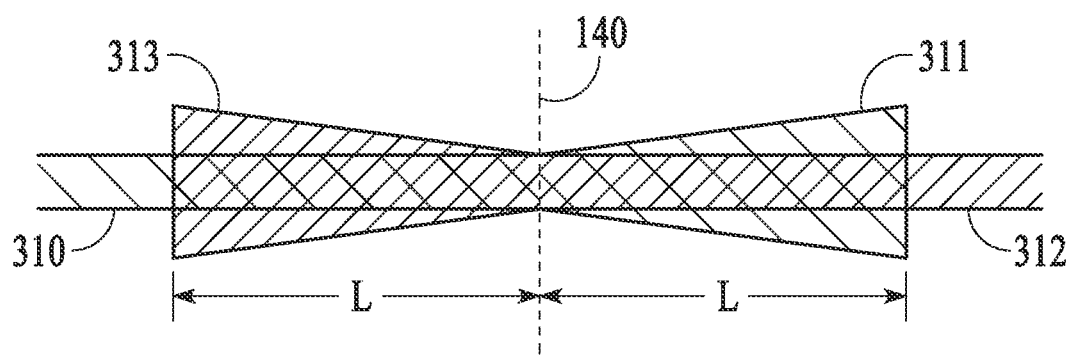
FIG. 3 is an even further exploded top view of one turn, showing overlay beyond the demarcation line between the two reticle fields, as well as special tapered structures extending from one reticle field into the other reticle field to minimize optical loss due to possible misalignment between the two adjacent reticle fields, according to an embodiment of the present disclosure.

FIG. 3 is an even further exploded top view of one turn, showing overlay beyond the demarcation line between the two reticle fields, as well as special tapered structures extending from one reticle field into the other reticle field to minimize optical loss due to possible misalignment between the two adjacent reticle fields, according to an embodiment of the present disclosure. It can be imagined that FIG. 3 is a modified version of the portion of the structure shown within the bounding box 230 in FIG. 2. The waveguide portion 310 is similar to waveguide portion 210a in FIG. 2, but as an additional tapered end 311 of length "L" extending beyond the demarcation line 140. Similarly, the waveguide portion 312 is similar to waveguide portion 210b in FIG. 2, but as an additional tapered end 313 of length "L" extending beyond the demarcation line 140. Note that the dimension of the taper (i.e. length and angle of taper) depends on the mode of the optical beam being propagated within the waveguide.

Figure 4:
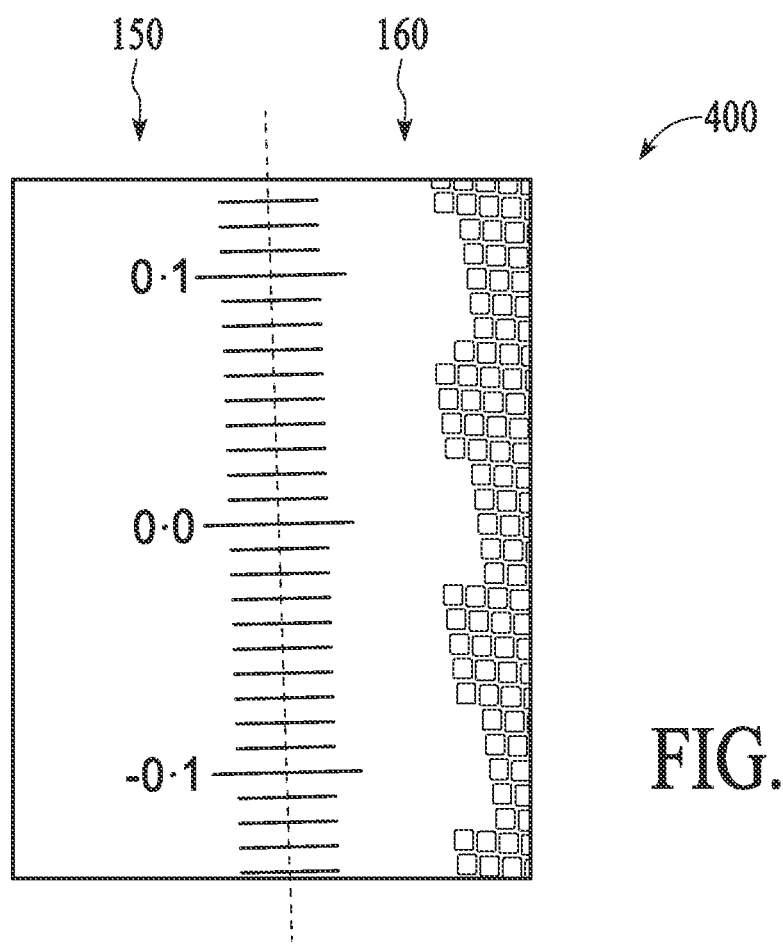
FIG. 4 is a schematic top view showing a first type of alignment mark to facilitate and validate proper stitching between the two adjacent reticle fields, according to an embodiment of the present disclosure.

FIG. 4 is a schematic top view showing a first type of alignment mark 400, in the form of a Vernier caliper, that facilitates and validates proper stitching between the two adjacent reticle fields. For example, when the "0.0" marks on both sides of the dashed central axis are properly aligned, as shown in FIG. 4, then stitching error is zero or minimal.

Figure 5:
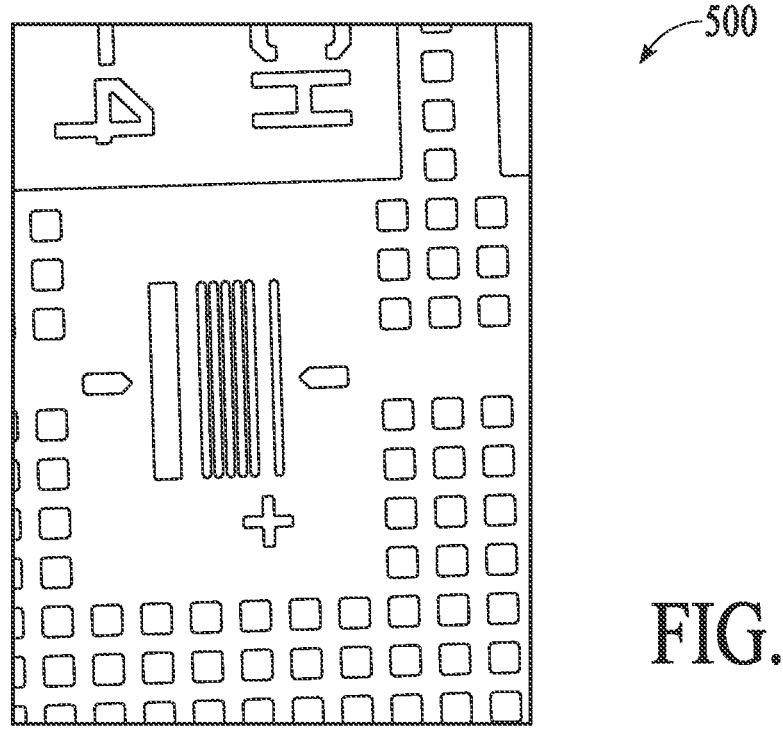
FIG. 5 is a schematic top view showing a second type of alignment mark to facilitate and validate proper stitching between the two adjacent reticle fields, according to an embodiment of the present disclosure.

FIG. 5 is a schematic top view showing a second type of alignment mark 500 to facilitate and validate proper stitching between the two adjacent reticle fields.

Figure 6:
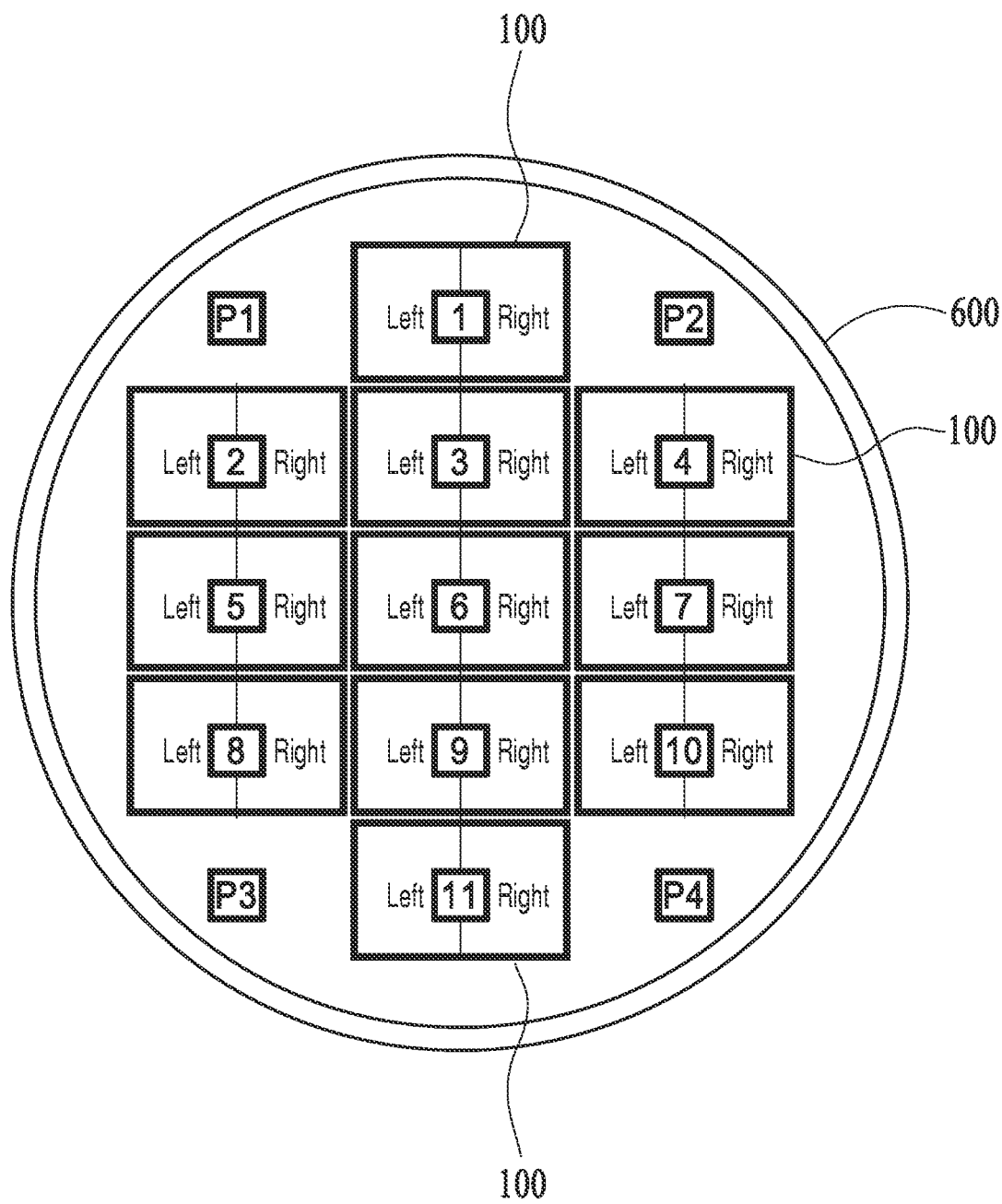
FIG. 6 is a schematic top view of a full wafer showing the full dies and the two stitched reticle fields within each die, according to an embodiment of the present disclosure.

FIG. 6 is a schematic top view of a full wafer showing the full dies and the two stitched reticle fields within each die. Number of dies that can be obtained from each full wafer depends on individual die size. For example, 11 dies, each having 50 mm×32.5 mm, can be obtained from a full wafer (200 mm wafer). It will be different for a different size wafer, for example a 150 mm or 300 mm wafer. Left portion of each die can be exposed using a stepper's first exposure, and the right side of each die can be exposed using the stepper's second exposure. The corner areas P1, P2, P3, and P4 cannot be used as a die, but can be used for positioning alignment marks and test structures to utilize the real estate on the wafer for beneficial purposes. Note that each die also has alignment marks placed at various locations within and outside of the waveguide based structure, such as the gyroscope coil shown in FIG. 1.

Figure 7:
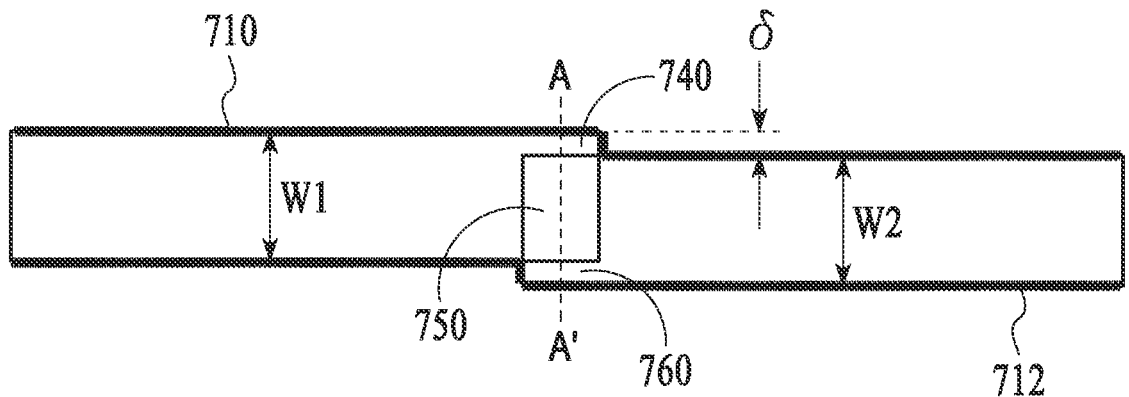
FIG. 7 is a simplified schematic top view of an overlapping area where two adjacent reticle fields are stitched, according to an embodiment of the present disclosure.
Figure 8:
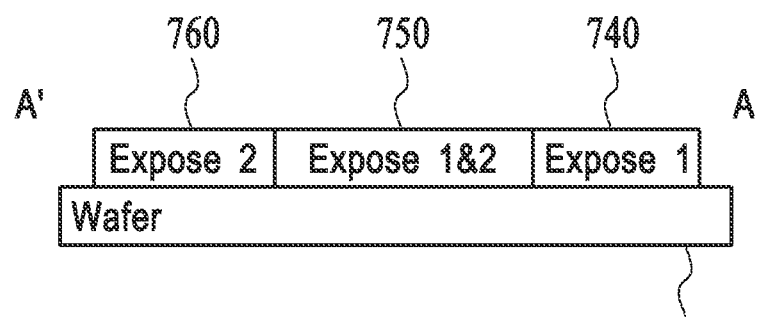
FIG. 8 is a schematic cross-sectional view of the overlapping area shown in FIG. 7, showing the various areas that are exposed once or twice as necessitated by the lithographic process flow, according to an embodiment of the present disclosure.

FIG. 7 is a simplified schematic top view of an overlapping area where two adjacent reticle fields are stitched, according to an embodiment of the present disclosure. FIGS. 7 and 8 collectively also show the lithographic process flow using the stepper as the exposure tool. W1 is the width of waveguide portion 710 to be fabricated using the first reticle. W2 is the width of waveguide portion 712 to be fabricated using the second reticle. Ideally, W1 and W2 have the same dimension. There is slight lateral misalignment δ which can be corrected with the help of the alignment marks, or the loss due to misalignment can be mitigated by making the ends of the waveguide portions 710 and 712 tapered. In general the lithographic process flow is as follows: spin photoresist, use the first reticle, align the stepper with the first reticle, expose to fabricate the structures in the first reticle, use the second reticle, align the stepper with the second reticle, expose to fabricate the structures in the second reticle, perform post-exposure bake, and develop photoresist to create the underlying waveguide structure.

FIG. 8 is a schematic longitudinal cross-sectional view of the overlapping area shown in FIG. 7, showing the various areas that are exposed once or twice as necessitated by the litho process flow. The structure is fabricated on the wafer 850. If a cross section along the line AA' (in FIG. 7) is taken, as shown in the longitudinal cross sectional view in FIG. 8, three different areas can be seen—area 740 is exposed during the first exposure, overlapping area 750 is exposed twice, both during the first and the second exposures, and area 760 is exposed during the second exposure.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. A method for fabricating integrated photonics-based optical components on a die using a plurality of reticles, the method comprising:

using a first reticle to fabricate a first portion of the die containing a first portion of an optical waveguide that constitutes an integrated photonics-based optical component;

using a second reticle to fabricate a second portion of the die containing a second portion of the optical waveguide that constitutes the integrated photonics-based optical component; and stitching respective fields of the first reticle and the second reticle in a way such that the first portion of the optical waveguide and the second portion of the optical waveguide are aligned on the same plane to create a seamless interface for a guided optical beam that propagates along the optical waveguide, wherein the respective fields of the first reticle and the second reticle are adjacent to each other, and, wherein the first reticle has a first tapered structure that is used to fabricate an extension of the second portion of the optical waveguide into a first field of the first reticle, and the second reticle has a second tapered structure that is used to fabricate an extension of the first portion of the optical waveguide into a second field of the second reticle, wherein the first tapered structure and the second tapered structure are adjacent to each other on the same plane;

wherein the die, including the first portion of the die and the second portion of the die, is repeated in a two-dimensional array across a wafer during fabrication.

2. The method of claim 1, further comprising:

including a first portion of an alignment mark in the first reticle;

including a second portion of the alignment mark in the second reticle; and using an alignment between the first portion of the alignment mark and the second portion of the alignment mark as an indicator of a degree of alignment between the first portion of the optical waveguide and the second portion of the optical waveguide during stitching the respective fields of the first reticle and the second reticle with each other.

3. The method of claim 2, wherein the first portion of the alignment mark and the second portion of the alignment mark together constitute a Vernier caliper.

4. The method of claim 3, wherein the Vernier caliper indicates the degree of alignment along a direction on a plane that is perpendicular to a direction of propagation of the guided optical beam.

5. The method of claim 1, wherein respective relevant dimensions of the first tapered structure and the second tapered structure are designed based on a mode of the guided optical beam.

6. The method of claim 5, wherein the respective relevant dimensions of the first tapered structure and the second tapered structure include a taper angle and taper length.

7. The method of claim 1, where each of the first tapered structure and the second tapered structure creates an overlay region that facilitates in creating the seamless interface for the guided optical beam by stitching of the respective reticle fields of the first reticle and the second reticle resulting in minimization of optical loss due to possible misalignment along a direction perpendicular to the direction of propagation of the guided optical beam.

8. The method of claim 1, wherein the die has a footprint which is larger than what a single reticle field can accommodate.

9. The method of claim 8, wherein the die is fabricated using the following process:

coating an entire wafer containing the die with photoresist;

using the first reticle to fabricate the first portion of the die, wherein the first portion of the die has an overlay region that is an extension of the second portion of the optical waveguide to be fabricated in the second portion of the die;

aligning an exposure tool with the first reticle;

exposing the field of the first reticle;

using the second reticle to fabricate the second portion of the die wherein the second portion of the die has another overlay region that is an extension of the first portion of the optical waveguide already exposed in the second portion of the die;

aligning the exposure tool to fabricate the second portion of the die;

performing post-exposure bake, wherein the overlay regions are exposed twice; and developing the photoresist to create underlying integrated photonics-based optical components of the die.

10. A die having integrated photonics-based optical components that are fabricated using a plurality of reticles, the die comprising:

a first portion of the die fabricated using a first reticle, wherein the first portion of the die contains a first portion of an optical waveguide that constitutes an integrated photonics-based optical component;

a second portion of the die fabricated using a second reticle, wherein the second portion of the die contains a second portion of the optical waveguide that constitutes the integrated photonics-based optical component;

wherein the first portion of the optical waveguide and the second portion of the optical waveguide are aligned on the same plane to create a seamless interface for a guided optical beam that propagates along the optical waveguide, wherein respective fields of the first reticle and the second reticle are adjacent to each other, and are stitched with each other, and, wherein the first reticle has a first tapered structure that is used to fabricate an extension of the second portion of the optical waveguide into a first field of the first reticle, and the second reticle has a second tapered structure that is used to fabricate an extension of the first portion of the optical waveguide into a second field of the second reticle, wherein the first tapered structure and the second tapered structure are adjacent to each other in the same plane;

wherein the die, including the first portion of the die and the second portion of the die, is repeated in a two-dimensional array across a wafer during fabrication.

11. The die of claim 10, wherein the integrated photonics-based optical component comprises a rotation sensing element of an optical gyroscope.

12. The die of claim 11, wherein the rotation sensing element is a waveguide coil with multiple turns.

13. The die of claim 11, wherein the rotation sensing element is a waveguide loop with a single turn comprising a microresonator ring.

14. The die of claim 10, wherein the integrated photonics-based optical component comprises an optical delay line.

15. The die of claim 10, wherein the integrated photonics-based optical component comprises an optical phase array.

16. The die of claim 10, wherein the integrated photonics-based optical component comprises an n×m optical switch.

17. The die of claim 10, wherein the integrated photonics-based optical component comprises a cross bar switch.

18. The die of claim 10, wherein the die has a footprint which is larger than what a single reticle field can accommodate.

* * * * *